(12) United States Patent
Pavlidis et al.

(10) Patent No.: US 9,299,100 B2
(45) Date of Patent: Mar. 29, 2016

(54) DETERMINING GIFTABILITY OF A PRODUCT BASED ON RECIPIENT INTERESTS

(75) Inventors: Ioannis Pavlidis, Boulder, CO (US); Wei Shen, Danville, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/601,579

(22) Filed: Aug. 31, 2012

(65) Prior Publication Data
US 2014/0067594 A1   Mar. 6, 2014

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0631* (2013.01); *G06Q 30/0241* (2013.01); *G06Q 30/0282* (2013.01)

(58) Field of Classification Search
CPC .............. G06Q 30/0631; G06Q 30/02; G06Q 30/0601; G06Q 30/0282
See application file for complete search history.

(56) References Cited

U.S. PATENT DOCUMENTS

| | | | |
|---|---|---|---|
| 7,130,820 B2* | 10/2006 | Song | 705/7.18 |
| 2005/0119947 A1* | 6/2005 | Lin | 705/27 |
| 2010/0169160 A1* | 7/2010 | Wu et al. | 705/10 |
| 2012/0197750 A1* | 8/2012 | Batra et al. | 705/26.7 |
| 2012/0271732 A1 | 10/2012 | Glass | |
| 2012/0278147 A1 | 11/2012 | Kogan | |

* cited by examiner

*Primary Examiner* — William Allen
*Assistant Examiner* — Anand Loharikar
(74) *Attorney, Agent, or Firm* — Bryan Cave LLP

(57) ABSTRACT

Methods for making gift recommendations are disclosed. The interests of an intended recipient are identified as are the interests associated with a particular product. Products corresponding to the recipient's interests are identified and then ranked according to giftability. Giftability indicates the appropriateness of a product for giving as a gift. Products may also be ranked according to appropriateness for a category or occasion. Giftability may be specified or inferred from one or more of gift-wrapping requests, gifting references in comments or reviews, and sales surges during holidays. A Naïve-Bayes-type method may be used to infer the giftability of products for which such data is not available.

20 Claims, 7 Drawing Sheets

DETERMINING GIFTABILITY OF A PRODUCT BASED ON RECIPIENT INTERESTS

RELATED APPLICATIONS

This application is related to U.S. application Ser. No. 13/601,604, filed Aug. 31, 2012.

BACKGROUND

1. Field of the Invention

This invention relates to systems and methods for making product recommendations appropriate for a recipient's interest and that are suited for giving as a gift.

2. Background of the Invention

One of the facets of shopping is gifting. Gifting may be the act of giving a present to somebody because of an occasion (e.g., birthday) or event (e.g., house warming party). People may also treat themselves or loved ones to a gift. Regardless of the occasion or the reason for gifting, there is often one common goal: delight the receiver. Although some approaches have been used to provide recommendations according to the interest of the recipient of a gift, these approaches do not take into account whether products related to the recipient's interests are in fact suitable for giving as a gift.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and therefore are not therefore to be considered in limiting the invention's scope, the invention will be described and explained with additional specificity and detail through use of the accompanying drawings, in which.

DETAILED DESCRIPTION

Figure 1:
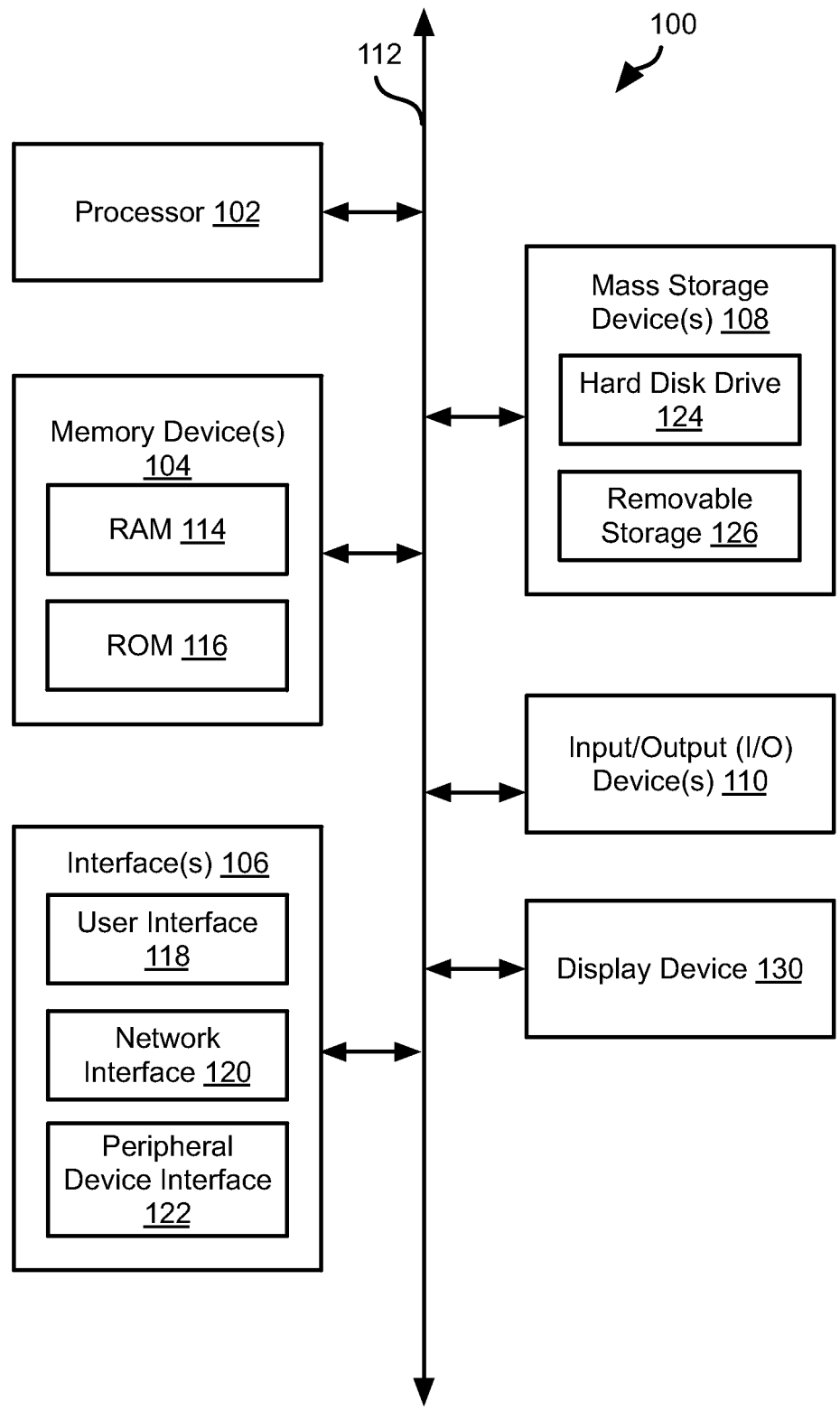
FIG. 1 is a schematic block diagram of an example computer system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for determining the giftability of a product for use in making gift recommendations.

Past activity relating to a product may be analyzed to determine whether the product has been the subject of gifting activity. This may include analyzing such factors as whether gift-wrapping has been requested when a product was ordered, whether the product description indicates suitability for giving as a gift, or whether sales of the product surge during one or more holidays. By analyzing these activities, giftability scores may be assigned to products. A category giftability score may also be associated with a product by identifying responses to category-based or interest-based search results or advertisements. Upon receiving a trigger or request for a gift recommendation, products relating to a recipient's interests may be identified and then ranked according to giftability scores associated with the products.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, or a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like. Computer program code may also be written in more conventional procedural programming languages, such as the "C" programming language or other similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer, i.e., through the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

As shown in FIG. 1, computing device 100 includes one or more processor(s) 102, one or more memory device(s) 104, one or more interface(s) 106, one or more mass storage device(s) 108, one or more input/output (I/O) device(s) 110, and a display device 130, all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory, i.e., random access memory (RAM) 114, and/or nonvolatile memory, i.e., read-only memory (ROM) 116. Memory device(s) 104 may also include rewritable ROM, such as flash memory.

Mass storage device(s) 108 include various computer readable media, such as magnetic tapes, magnetic disks, optical disks, solid-state memory (e.g., flash memory), and the like. As shown in FIG. 1, a particular mass storage device is a hard disk drive 124. Various drives may also be included in mass storage device(s) 108 to enable reading from and/or writing to the various computer readable media. Mass storage device(s) 108 includes removable media 126 and/or non-removable media.

I/O device(s) 110 include various devices that allow data and/or other information to be inputted to or retrieved from computing device 100. Example I/O device(s) 110 include cursor control devices, keyboards, keypads, microphones, monitors or other display devices, speakers, printers, network interface cards, modems, lenses, CCDs and other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and the like.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or in a combination of hardware, software, and/or firmware. For example, one or more application specific integrated circuits (ASICs) can be programmed to carry out one or more of the systems and procedures described herein.

Figure 2:
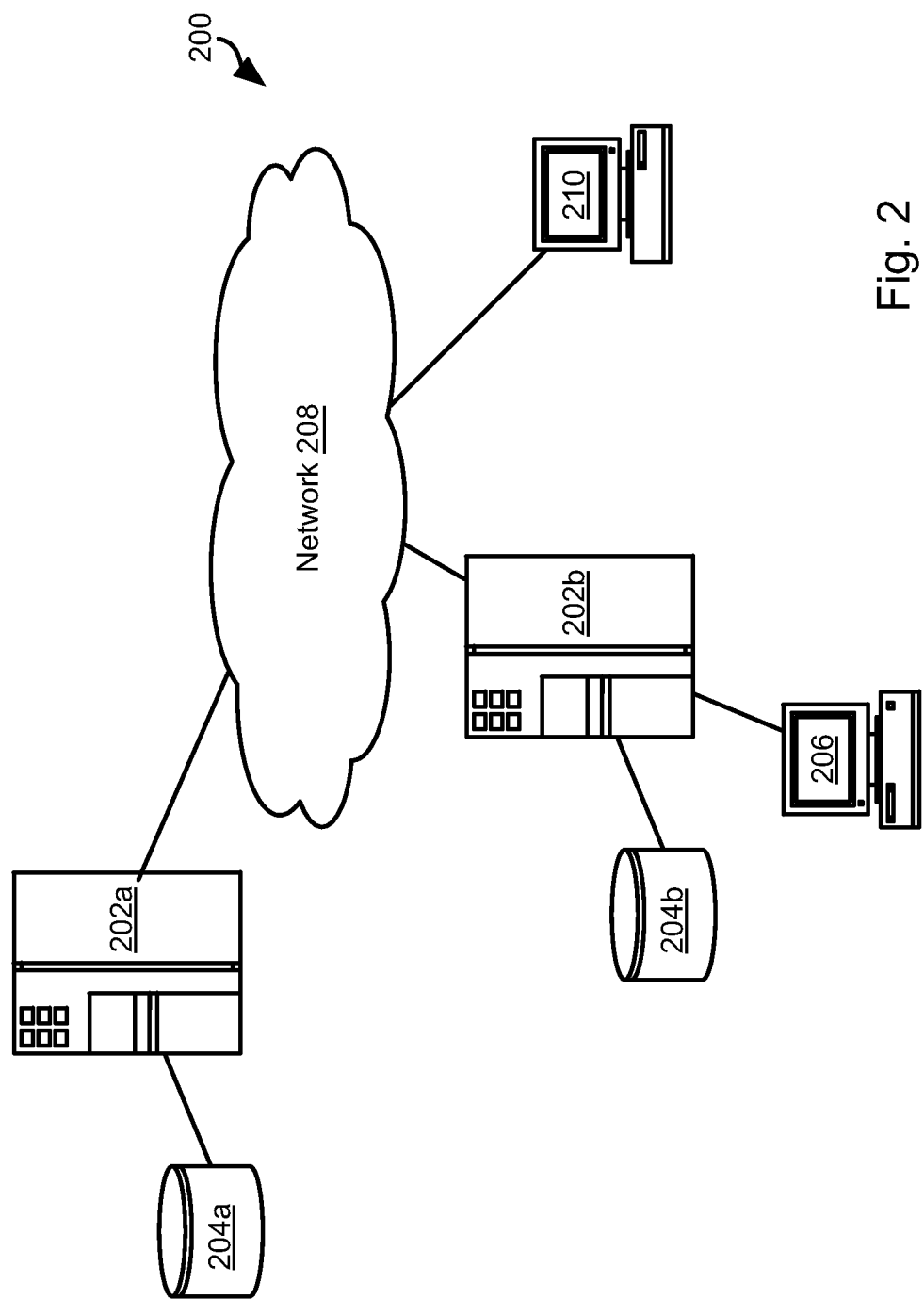
FIG. 2 is a schematic block diagram of an example network environment.

FIG. 2 illustrates an example of a computing environment 200 suitable for implementing the methods disclosed herein. In some embodiments, a server 202a provides access to a database 204a in data communication therewith. The database 204a may store social media information such as a user profile as well as a list of other user profiles of friends and associates associated with the user profile. The database 204a may additionally store postings made by the user associated with the user profile. The social media information hosted by the database 204a may correspond to social media such as Facebook™, Twitter™, Foursquare™, LinkedIn™, or the like. The server 202a may provide access to the database 204a to users associated with the user profiles. For example, the server 202a may implement a web server for receiving requests for data stored in the database 204a and formatting requested information into web pages. The web server may additionally operate to receive information and store the information in the database 204a.

A server 202b may be associated with a merchant or by another entity providing gift recommendation services. The server 202b may be in data communication with a database 204b. The database 204b may store information regarding various products. In particular, information for a product may include a name, description, categorization, reviews, comments, price, past transaction data, and the like. The server 202*b* may analyze this data as well as data retrieved from the database 204*a*, described in further detail below, in order to perform methods as described herein. An operator may access the server 202*b* by means of a workstation 206 that may be embodied as any general purpose computer, tablet computer, smart phone, or the like.

The server 202*a* and the server 202*b* may communicate with one another over a network 208 such as the Internet or some other local area network (LAN), wide area network (WAN), virtual private network (VPN), or other network. A user may access data and functionality provided by the servers 202*a*, 202*b* by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202*a*-202*b*, and databases 204*a*, 204*b* may have some or all of the attributes of the computing device 100, as shown in FIG. 1.

Figure 3:
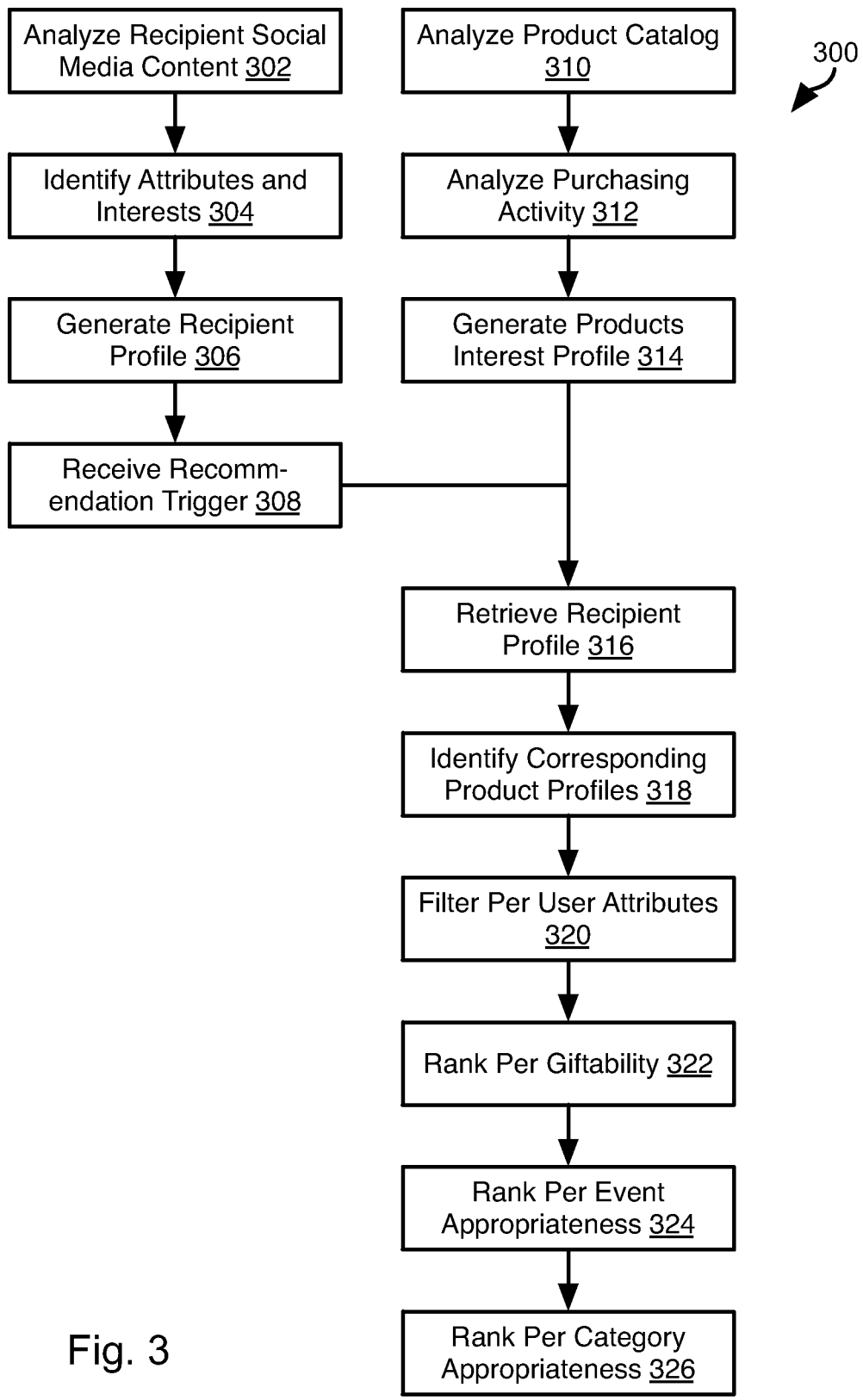
FIG. 3 is a process flow diagram of a method for selecting giftable products in accordance with an embodiment of the present invention.

FIG. 3 illustrates a method 300 for selecting products according to giftability and a recipient's interests. Accordingly, the method 300 may include identifying the interests of a user. This may include receiving answers to questions regarding interests from a recipient or potential gift giver or performing an automated analysis of information available regarding a recipient. For example, the illustrated method 300 may include steps for performing automated analysis, including analyzing 302 social media content of a recipient. This may include analyzing one or more of a recipient's profile, postings, likes, dislikes, wants, and the comments of a recipient. Some or all of this same information may also be analyzed for one or more friends of the recipient as identified according to the recipient's social media data. Attributes and interests of the recipient may be identified 304 based on the social media content analysis 302. Attributes may include such information as age, gender, race, location, and other personal and demographic information. Some of this information may be retrieved from other sources based on the identity of the recipient.

Interests of the recipient may be identified 304 based on a simple key word search or a more complex analysis of the concepts actually referenced in the analyzed data. For example, concepts identified in a corpus of data for a recipient may be identified according to the methods for extracting and ranking concepts in documents described in U.S. patent application Ser. No. 13/300,524, entitled "PROCESSING DATA FEEDS," filed Nov. 18, 2011, which is hereby incorporated herein by reference in its entirety. Identifying 304 interests of the recipient may include scoring or otherwise ranking the interests according to a calculated degree of affinity for the user to the concept. This may include a ranking of relevance of the interests to a corpus of text associated with a user according to the ranking methods of the '524 application, or some other method known in the art, where the corpus of text is the recipient's social media profile and postings made on social media sites or elsewhere.

A recipient profile incorporating the identified 304 attributes and interests may be used to generate 306 a recipient profile that may be stored for later use. The interests actually stored in the profile may be a subset of all interests that have been identified as more important.

At some point either before or after a recipient profile is generated 306, a recommendation trigger may be received 308. The recommendation trigger may include an explicit request received from a user for gift recommendations for a recipient. The recommendation trigger may also be a user viewing or requesting to view a merchant's web site. The recommendations as generated according to methods described herein may be presented as an unsolicited advertisement or as search results. A recommendation trigger may also include a simple search that references gifting, a recipient, an occasion where gifts are conventionally given, or some other concept indicating that giftability ranking may be appropriate.

In response to receipt 308 of the recommendation trigger, the steps described herein for determining a giftable product may be performed. The steps for determining an appropriate gift may assume products having interests or attributes associated therewith.

Analyzing 310 the product catalog may include identifying attributes and interests associated with each product in the catalog. This may include an analysis similar to the one performed for the social media content. For example, analyzing 310 the product catalog may include a simple identification of key words in a product description, or it may include a more sophisticated analysis of concepts in textual information associated with a product such as a product name, description, reviews, comments, social media postings, and the like. Textual information for a product may by analyzed 310 by performing the identification and ranking of concepts according to the methods described in the '524 application incorporated herein by reference.

Analyzing 312 purchase activity may include analyzing transactions in order to identify information such as products that were purchased in the same order. This identification may be performed for the purposes of identifying or clarifying common interests associated with the products. Analyzing 312 purchase activity may include analyzing responses of users to interest-based search results or advertisements, as described hereinbelow. The results of the analysis 310 and the analysis 312 may be used to generate 314 product interest profiles for the products in the product catalog. As for the recipient profile, a product profile may include a subset of all interests identified as relevant to the product. For example, the top N most relevant interest for a product may be included in the product profile. The interests included in the product profile for a product may also be weighted or scored based on their relevance to the product.

In response to receipt 308 of the recommendation trigger, the recipient profile may be retrieved 316 and product profiles corresponding to the recipient's interests may be identified 318. The identified product profiles may then be filtered 320 according to user attributes. For example, products appropriate for a female may be removed if the recipient is found to be male. As noted above, a product may be analyzed to determine the likely attributes of a consumer for that product. Accordingly, filtering 320 according to user attributes may include the removal of products having corresponding attributes that do not correspond to the attributes of the recipient.

Remaining product profiles may be ranked 322 according to giftability. The product profiles may additionally be ranked 324 according to event appropriateness. The remaining product profiles may also be ranked 326 according to category appropriateness. The category or categories used to rank 326 the products according to category appropriateness may correspond to one or more interests identified in the recipient profile or identified in a search that triggered 308 the generation of a recommendation. Ranking 326 according to category appropriateness may take into account the recipient's affinity to a category or interest. For example, raking 326 may include ranking both according to a relevance score of a product to an interest of the recipient as well as the affinity of the user to that interest. One or more of the rankings 322, 324, 326 may be performed simultaneously, by summing, or otherwise combining, a giftability score and category appropriateness score for each product and then ranking the products according to the summed or combined scores.

The resulting list of products as ranked may be displayed or transmitted for display to a user. As displayed, the list advantageously discloses products that are both relevant to the recipient's interest and satisfy a giver's desire to find an item that will delight the recipient.

Figure 4:
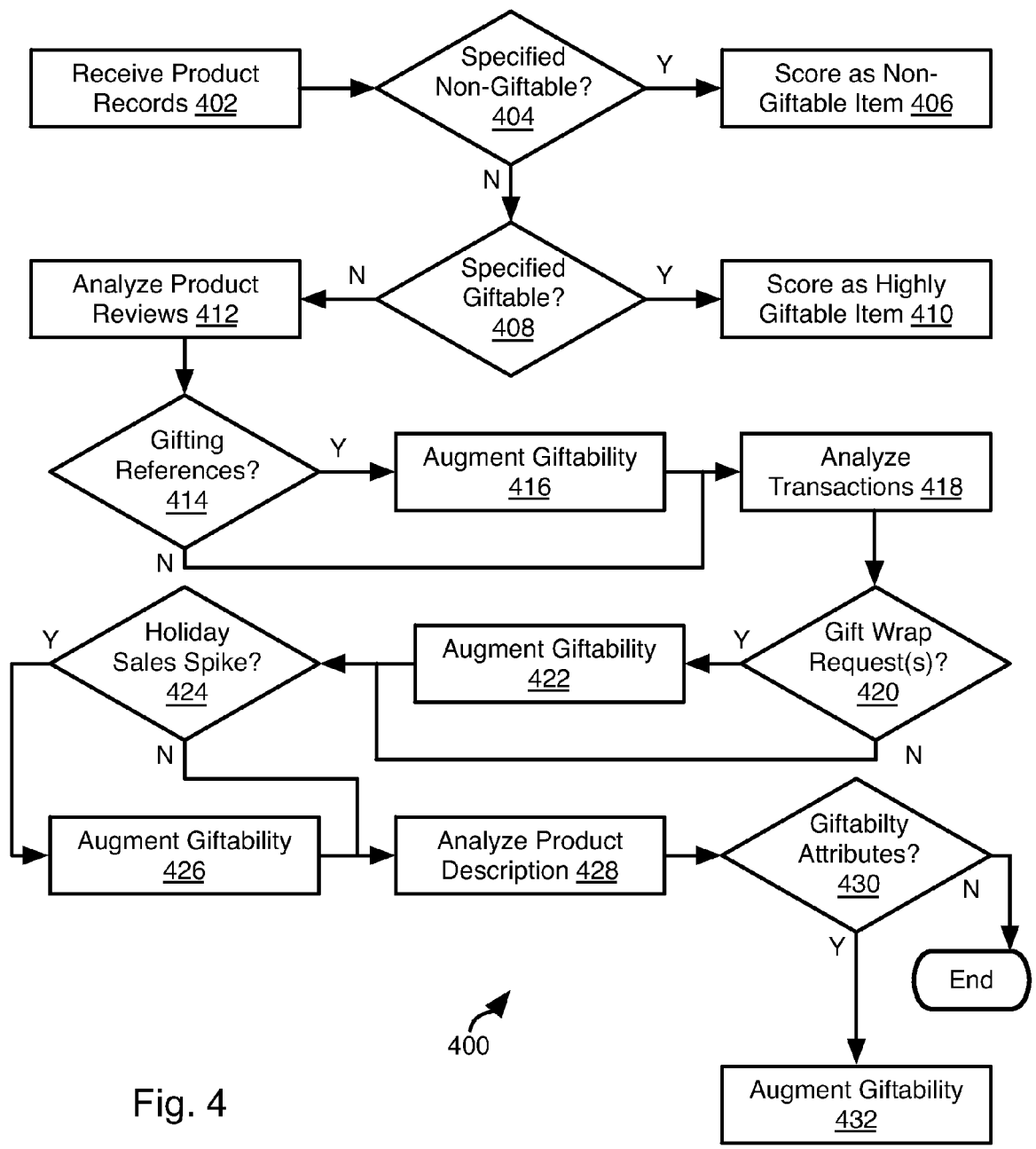
FIG. 4 is a process flow diagram of a method for assigning a giftability score to a product in accordance with an embodiment of the present invention.

FIG. 4 illustrates a method 400 for determining the giftability of a product. The method 400 may include receiving 402 product records. The product records may be evaluated 404 to determine whether a product has been specified as non-giftable. If a product is found 404 to be specified as non-giftable, then the product may be scored 406 as non-giftable and the method 400 may end with respect to the product. The method 400 may also include evaluating 408 whether the product has been specified as giftable. If so, then the product is scored 410 as a highly giftable item. If a product is not found 408 to have been specified as giftable, then product reviews relating to the product may be analyzed 412. If the product reviews are found 414 to include gifting references, then the giftability for the product may be augmented 416.

The method 400 may also include analyzing 418 transactions involving the product. For example, if one or more transactions involving a product are found 420 to include a request to gift-wrap the product, then the giftability for the product may be augmented 422. The amount by which the giftability of the product is augmented may be proportional to the number of orders, or proportion of orders, for a product in which gift-wrapping was requested, or some combination or function involving these values.

If transactions for a product are found 424 to exhibit a spike or surge around holidays or specific events, then the giftability may be augmented 426. The amount of augmentation of giftability may be in proportion to the size of the spike or surge. For example, giftability may be augmented if the sales volume $V_{holiday}$ for the month of December, or some other holiday period, is larger than a specified percentage of sales volume $V_{year}$ for the year, i.e., $V_{holiday} > rV_{year}$, where r is a value less than 1. The amount by which the giftability for the product is augmented may increase based on the amount by which the sales volume around the holiday exceeds the value $rV_{year}$.

The method 400 may additionally include analyzing 428 a product description for the product, if the product description is found 430 to have attributes indicating giftability, then the giftability of the product may be augmented 432; otherwise, the method 400 may end. An example of a "giftability attribute" may include an indication that a product is a collector's item or that a product is especially entertaining or fun in some way.

The various giftability augmentation steps 416, 422, 428, 432 may include adding a value to a giftability score that was initially equal to zero. Alternatively, augmentation may be performed according to any arbitrary function. For example, the augmentation steps 416, 422, 428, 432 may be weighted prior to addition.

Figure 5:
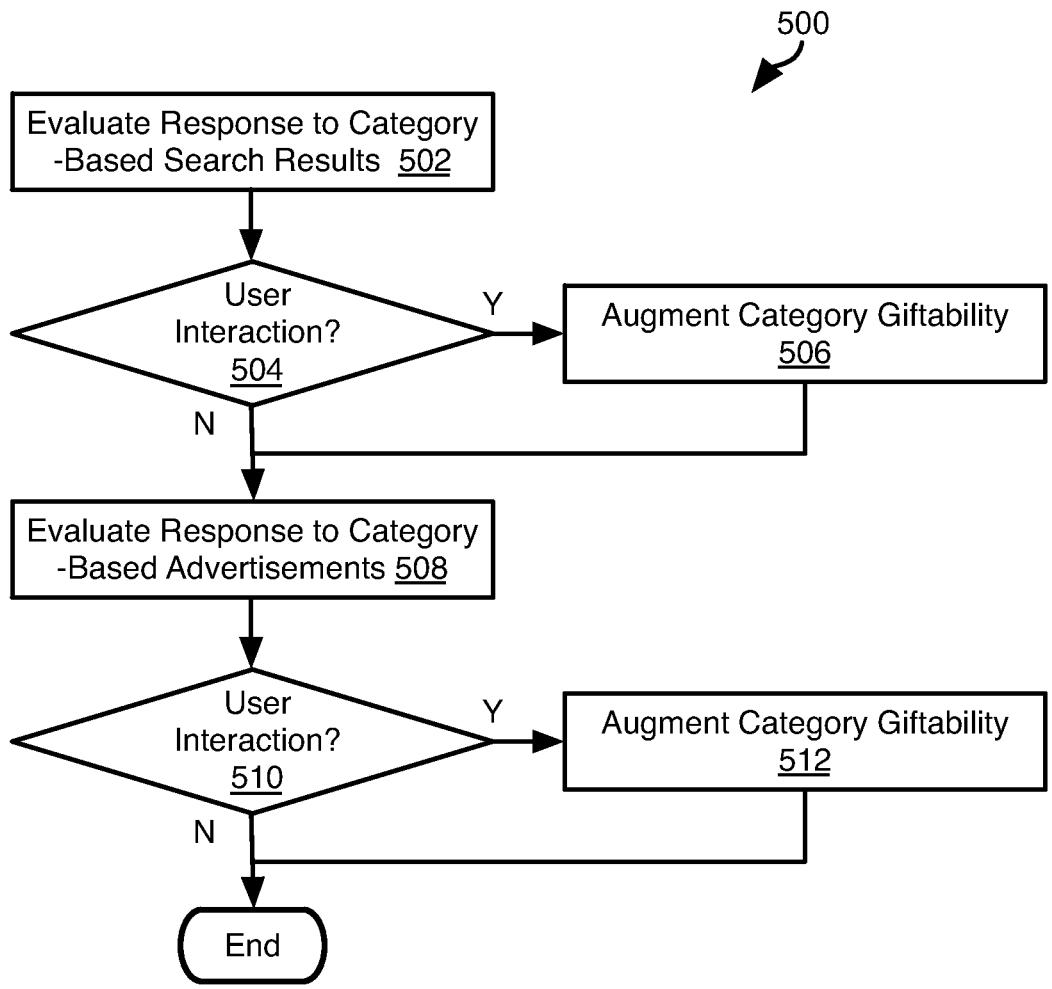
FIG. 5 is a process flow diagram of a method for assigning a category giftability score to a product in accordance with an embodiment of the present invention.

Referring to FIG. 5, as noted with respect to the method 300 of FIG. 3, products may be ranked 324 according to event appropriateness and/or ranked 326 according to category appropriateness. The method 500 of FIG. 5 may be used to score products according to appropriateness for a category or event. For purposes of the method 500, an event may be processed in the same manner as a category in order to generate an appropriateness score for a product corresponding to the event.

The method 500 may include evaluating 502 user responses to category-based search results 502. As noted with respect to FIG. 3, a product may have interests and attributes associated therewith. A user may search a product catalog or search engine for products relating to a particular category. Products having related interests corresponding to that category may be presented as results for the search. The category may be identical to a specific interest or relate to a plurality of interests. A user response to these search results may be the subject of the evaluation 502. If user interaction with a search result referencing a product is found 504 to have occurred, then a category giftability score for the category defined by the search may be augmented 506 for the product.

The initial value for a category giftability score may be based on the product's attributes. The product attributes may include a categorization in a product catalog, a text description, a gender designation, an appropriate age, and other data. Some of these attributes may simply map to an attribute that can be sued in a product profile. Other attributes may be analyzed to identify concepts relating to the product. For example, a product description and other information may be used as a document that is analyzed to identify concepts, such as using the methods for identifying and ranking concepts in a document described U.S. patent application Ser. No. 13/300,524, entitled "PROCESSING DATA FEEDS," filed Nov. 18, 2011, which is hereby incorporated herein by reference in its entirety. Concepts associated with the product according to the foregoing methods may receive a score indicating their relatedness to the concept. These scores may be used as initial values for the category giftability score and may be used to select products in response to category-based search results or to present category-based advertisements. These scores may also be augmented or decremented in response to user interaction as described below.

User responses may include any interaction with the search result, such as a mouse-over event, a click, a purchase originating from the search results, or any other interaction. The category giftability score for the product corresponding to the category defined in the search may be augmented 506 according to user interaction. The category score may be augmented 506 by different amounts for different types of interactions. For example, a mouse-over event may be scored a first amount, a click may be scored a second amount larger than the first amount, and a purchase may be scored a third amount larger than the second amount.

The amount by which the category giftability score is augmented may be normalized or otherwise adjusted according to the number of times the product has appeared in searches relating to the category corresponding to the category giftability score. For example, the value computed according to augmenting step 506 may be divided by the number of times the product has appeared in searches relating to the category.

The method 500 may further include evaluating 508 user responses to category-based advertisements or recommendations. A category-based advertisement or recommendation may be displayed with search results for a search or request related to a category. Category-based advertisements may also be displayed with content relating to a category. Accordingly, responses to advertisements for a product that have been displayed because of a relationship to the product of the same category as the content or search may be evaluated 508. If user interaction with the category-based advertisement for a product is found 510 to have occurred, then the category giftability of the product with respect to the category of the content or search result may be augmented 512.

As for the augmentation step 506, user responses may include any interaction with the search result, such as a mouse-over event, a click, a purchase originating from the search results, or any other interaction. The category score for the product corresponding to the category associated with the advertisement may be augmented 512 according to user interaction. The category score may be augmented 512 by different amounts for different types of interactions. For example, a mouse-over event may be scored a first amount, a click may be scored a second amount larger than the first amount, and a purchase may be scored a third amount larger than the second amount. If no interaction with category-based advertisements or search results is found 504 or 510 to have occurred, the category score (which may be zero) may remain unchanged.

The amount by which the category giftability score is augmented 512 may be normalized or otherwise adjusted according to the number of times the product has appeared in advertisements displayed for content or search results relating to the category corresponding to the category giftability score. For example, the value computed according to augmenting step 512 may be divided by the number of times the product has appeared in advertisements relating to the category.

In order to determine event appropriateness of a product, the method 500 may be performed in the same way except that the "category" that is referenced in a search result or that gave rise to an advertisement or recommendation may be an event, such as a holiday, birthday, sporting event, or some other occasion.

Figure 6:
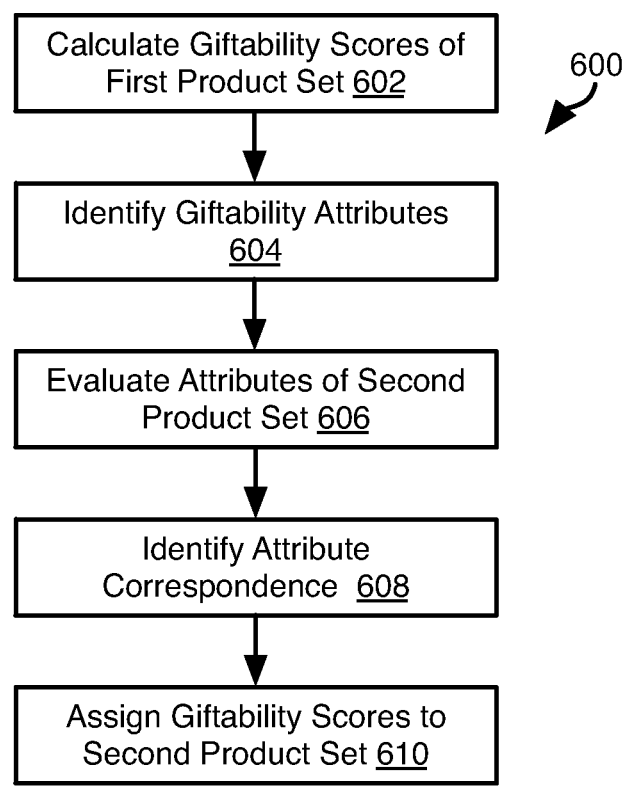
FIG. 6 is a process flow diagram of a method for inferring giftability scores for a product set in accordance with an embodiment of the present invention.

Referring to FIG. 6, in some instances data used according to the method 500 of FIG. 5 may not be available. This may be the case when evaluating new products that have not previously been sold by a merchant or when a catalog of a competitor or vendor is being analyzed for possible merchandising or affiliation. Accordingly, the illustrated method 600 may use giftability and other information for a first product set, or seed set, to infer the giftability of a second product set.

The method 600 may include calculating 602 giftability scores for a first product set. A giftability score may be coded using any type of value or variable. For example, a giftability score may be a giftability probability between 0 and 1 or a binary true or false value. Calculating 602 the giftability score may include evaluating the first product set according to the method 400 of FIG. 4. In some instances, giftability scores for some or all of the products of the first product set may be explicitly defined by user input.

The attributes of the products of the first product set may then be analyzed to identify 604 a correlation between a product's giftability score and the attributes associated therewith. The attributes may include textual attributes associated with a product such as a title, description, reviews, comments, social media content, categorization or classification information, and other textual information. The attributes of a product may also include non-textual information such as a price, a weight or normalized weight, and one or more dimensions, such as a three-dimensional shipping size.

The attributes of a second product set may then be evaluated 606 and a correspondence between the attributes of the second product set and the attributes of the first product set may then be identified 608. Giftability scores may then be assigned 610 to the second product set according to the correspondence between the attributes of the first product set and the attributes of the second product set.

Figure 7:
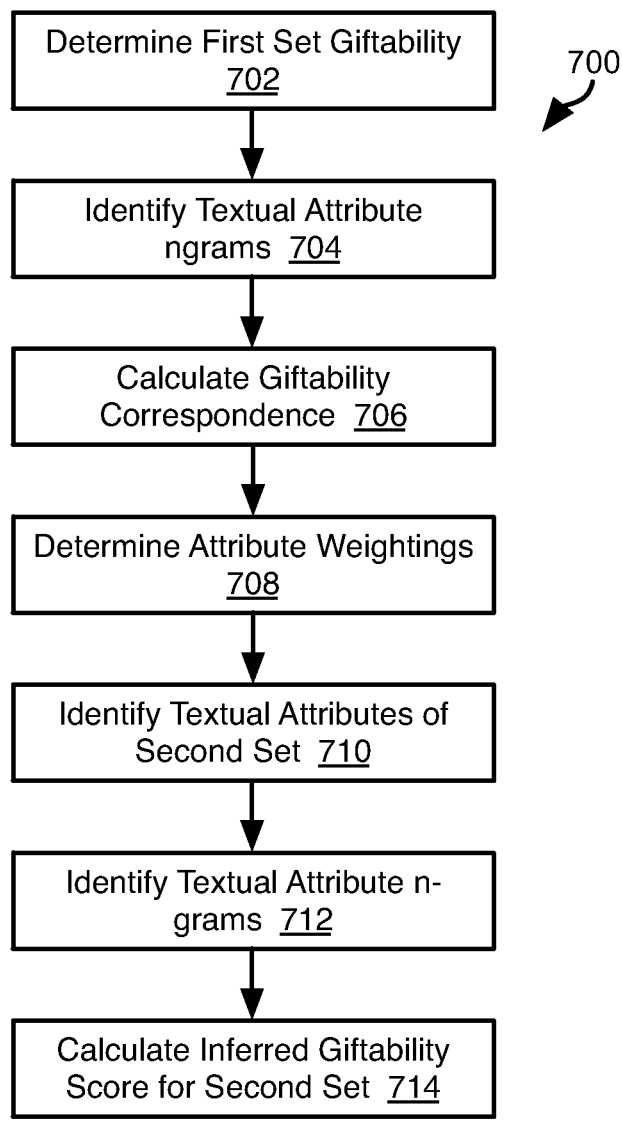
FIG. 7 is a process flow diagram of a method for assigning a giftability score to a product set according to giftability probabilities of n-grams associated with the product set in accordance with an embodiment of the present invention.

FIG. 7 illustrates an example of a method 700 for implementing the method 600 of FIG. 6. The method 700 may be used to determine the giftability of a second product set according to a known giftability of a first product set or "seed" product set. The method 700 includes determining 702 the giftability of the first product set. This may include evaluating the product set according to the method 400 and/or receiving a manually specified giftability score for the seed set.

Each product in the first product set may have a plurality of attributes each embodied as a textual attribute paired with a textual value. One or more of the products of the first product set may also include non-textual attributes, such as a price or other numeric or coded data.

One or more "n-grams" may be identified 704 for each textual attribute of each product. Multiple n-grams may incorporate the same words of a textual attribute. As known in the art, an n-gram is a contiguous sequence of n items from a given sequence of text or speech. An n-gram could be any combination of letters or words and may include white space such as tabs, spaces, etc.

Correspondence between the ngrams and giftability may then be calculated 706 for the n-grams of some or all of the textual attributes of the products in the first product set. This may include calculating a maximum likelihood estimation for some or all of the n-grams of the first product set for each textual attribute. This may involve, for each textual attribute of products in the first product set, calculating a positive maximum likelihood estimate $\hat{P}(k_a|+)$ and a negative maximum likelihood estimate $\hat{P}(k_a|-)$ according to (1) and (2). In (1) and (2), $\text{count}(k_a \cap +)$ and $\text{count}(k_a \cap -)$ represent the number of occurrences of the n-gram $k_a$ in a specified textual attribute of giftable products and non-giftable products, respectively. Values $\hat{P}(+)$ and $\hat{P}(-)$ may also be calculated according to (3) and (4), wherein $\text{count}(+)$ is the total number of giftable products in the first product set and $\text{count}(-)$ is the total number of non-giftable products in the first product set.

$$\hat{P}(k_a|+) = \frac{\text{count}(k_a \cap +)}{\text{count}(+)} \quad (1)$$

$$\hat{P}(k_a|-) = \frac{\text{count}(k_a \cap -)}{\text{count}(-)} \quad (2)$$

$$\hat{P}(+) = \frac{\text{count}(+)}{\text{count}(+) + \text{count}(-)} \quad (3)$$

$$\hat{P}(-) = \frac{\text{count}(-)}{\text{count}(+) + \text{count}(-)} \quad (4)$$

For purposes of the method 700, a product may be labeled as giftable or non-giftable. Where a numeric giftability score has been computed, a product may be labeled as giftable where the giftability score exceeds a first threshold. A product may be labeled as non-giftable where the giftability score is less than a second threshold. The first and second thresholds may be differently valued. In some embodiments, some products in the first product set may not be labeled as giftable or non-giftable where the giftability score of the product lies between the first and second thresholds.

A value y representing the "inferred giftability odds" may be calculated for some or all textual attributes of some or all products in a product set according to (5) using the values of $\hat{P}(k_a|+)$ and $\hat{P}(k_a|-)$ for the textual attribute. Equation (5) derives from the Naïve-Bayes method and assumes independence from observing any n-gram for both giftable and non-giftable products. In (5) the values of $\hat{P}(k_a|+)$ and $\hat{P}(k_a|-)$ used in the sequence product are only those corresponding to the n-grams $k_1 \ldots k_n$ of the textual attribute of the product corresponding to the value y.

$$y = \log \frac{\prod_{a=1}^{n} P(k_a|+)P(+)}{\prod_{a=1}^{n} P(k_a|-)P(-)} \quad (5)$$

In some instances, it is possible that one or more products may not define one or more textual attributes that are defined by other products. In such instances the value of y for the textual attribute of such products may be calculated according to (6).

$$\hat{y} = \log \frac{\hat{P}(+)}{\hat{P}(-)} \quad (6)$$

Once the value of y for the textual attributes of the products of the first product set are known, weights a, b, c may be determined 708 for use in equation (7). The values b and c may be vectors of values each corresponding to a particular textual or non-textual attribute, respectively, whereas a may represent a scalar value chosen to achieve an appropriate value of $P_i$. In (7), $P_i$ represents the inferred giftability probability for a product i, $X_i$ is a vector of non-textual attributes for the product i, and $Y_i$ is the vector of the values y for the textual attributes of the product i.

$$P_i = \frac{1}{1 + e^{-(a+bX_i+CY_i)}} \quad (7)$$

The weights a, b, and c may be calculated using one or more iterations of logistic regression. In particular, the weights a, b, and c may be calculated such that applying (7) to the first product set yields a value of $P_i$ that reflects the actual giftability score or the non-giftable/giftable designation for the product. The values of $P_i$ range from 0.5 for non-giftable products to 1.0 for an "infinitely" giftable product.

The method 700 may then include identifying 710 the textual attributes of the second product set and identifying 712 the n-grams of the identified textual attributes. An inferred giftability score may then be calculated 714 for the second product set. For each textual attribute of each product, a value y may be calculated using the values of $\hat{P}(k_a|+)$ and $\hat{P}(k_a|-)$ corresponding to the textual attribute as calculated using the first product set. In other words, the values of $\hat{P}(k_a|+)$ and $\hat{P}(k_a|-)$ corresponding to a textual attribute and the n-grams $k_a$ found in the textual attribute of a product of the second product set may be used to calculate a value y for that textual attribute according to (5) or (6). The y values ($Y_i$) for the textual attributes of a product i in the second product set and any non-textual values ($X_i$) for the product may be inputted to (7) using the previously calculated weights a, b, and c in order to calculate the inferred giftability score $P_i$ for the product.

The inferred giftability score may be used in any of the methods disclosed herein. For example, the inferred giftability score may be used to rank a product according to giftability in the context of the method 300 of FIG. 3. The inferred giftability score may also be used for other purposes such as selecting products to carry or evaluating the value of partnering with a prospective affiliate.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   determining, by a server, interests of a recipient by:
      receiving in real-time, at a first process, a first input stream event in a first real-time input data stream, the first real-time input data stream comprising a social networking data stream of the recipient;
      processing in real-time, at the first process, the first input stream event in a first map operation to generate first intermediate output data;
      transforming the first intermediate output data at the first process, to generate a first intermediate stream event associated with at least one slate of records that records a set of related stream events;
      transmitting in real-time, using the first process, the first intermediate stream event in a first real-time intermediate data stream;
      receiving in real-time, at a second process, the first intermediate stream event in the first real-time intermediate data stream;
      processing in real-time, at the second process, the first intermediate output data in the first intermediate stream event in a first update operation to generate final output data, the final output data comprising the interests of the recipient;
   storing, in a first database, the interests of the recipient;
   storing, in a second database, product information for products;
   querying, by the server, the second database for products of a first product set corresponding to the interests of the recipient;
   assigning, by the server, a giftability score to each of the products of the first product set, wherein the giftability score comprises:
      a first score if the product has been specified as giftable; or
      a second score if the product has been specified as non-giftable;
   querying, by the server, the second database for products corresponding to a second product set;
   calculating, by the server, an inferred giftability score for each of the products of the second product set based on the giftability score for each of the products of the first product set;
   ranking, by the server, each of the products of the first product set according to its giftability score; and
   transmitting, by the server to a remote computing device for display to a user, each ranked product of the first product set having a giftability score exceeding a giftability score threshold.

2. The method of claim 1, further comprising augmenting the giftability score in response to holiday surges in sales for the product.

3. The method of claim 1, further comprising augmenting the giftability score in response to gifting references in at least one of comments or reviews associated with the product.

4. The method of claim 1, further comprising augmenting the giftability score in response to gifting indicators in a product description associated with the product.

5. The method of claim 1, further comprising augmenting the giftability score in response to gift wrapping requests received in orders to purchase the product.

6. The method of claim 1, further comprising:
augmenting the giftability score in response to positive user responses to the product in category-based search results, and
decrementing the giftability score in response to negative user responses to the product in category-based search results, the category-based search results being relevant to at least one of the interests of the recipient.

7. The method of claim 1, further comprising:
augmenting the giftability score in response to positive user responses to the product in category-based advertisements, and
decrementing the giftability score in response to negative user responses to the product in category-based advertisements, the category-based advertisements being relevant to at least one of the interests of the recipient.

8. The method of claim 1, further comprising augmenting the giftability score in response to the product being associated with at least one of an event or an occasion.

9. The method of claim 1, further comprising:
ranking, by the server, each of the products of the second product set according to its inferred giftability score; and
transmitting, by the server for display to a user, each ranked product of the second product set having an inferred giftability score exceeding the giftability score threshold.

10. The method of claim 1, wherein:
each of the interests is associated with an affinity score indicating an affinity of the recipient to the interest; and
ranking, by the server, each of the products of the first product set according to its giftability score further comprises ranking each of the products of the first product set according to both its giftability score and at least one affinity score associated with the interests.

11. A system comprising one or more processors and one or more memory devices operably coupled to the one or more processors, the one or more memory devices storing executable and operational data effective to cause the one or more processors to:
determine, by a server, interests of a recipient by:
receiving in real-time, at a first process, a first input stream event in a first real-time input data stream, the first real-time input data stream comprising a social networking data stream of the recipient;
processing in real-time, at the first process, the first input stream event in a first map operation to generate first intermediate output data;
transforming the first intermediate output data at the first process, to generate a first intermediate stream event associated with at least one slate of records that records a set of related stream events;
transmitting in real-time, using the first process, the first intermediate stream event in a first real-time intermediate data stream;
receiving in real-time, at a second process, the first intermediate stream event in the first real-time intermediate data stream;
processing in real-time, at the worker process, the first intermediate output data in the first intermediate stream event in a first update operation to generate final output data, the final output data comprising the interests of the recipient;
store, in a first database, the interests of the recipient;
store, in a second database, product information corresponding to products;
query the second database for products of a first product set corresponding to the interests of the recipient;
assign a giftability score to each of the products of the first product set, wherein the giftability score comprises:
a first score if the product has been specified as giftable; or
a second score if the product has been specified as non-giftable;
query the second database for products corresponding to a second product set;
calculate an inferred giftability score of each of the products of the second product set based on the giftability score of each of the products of the first product set;
rank each of the products of the first product set according to its giftability score; and
transmit, for display to a user, each ranked product of the first product set having a giftability score exceeding a giftability score threshold.

12. The system of claim 11, wherein executable and operational data are further effective to cause the one or more processors to augment the giftability score in response to a holiday surge in sales for the product.

13. The system of claim 11, wherein executable and operational data are further effective to cause the one or more processors to augment the giftability score in response to gifting references in at least one of comments or reviews associated with the product.

14. The system of claim 11, wherein executable and operational data are further effective to cause the one or more processors to augment the giftability score in response to gifting indicators in a product description associated with the product.

15. The system of claim 11, wherein executable and operational data are further effective to cause the one or more processors to augment the giftability score in response gift wrapping requests received in orders to purchase the product.

16. The system of claim 11, wherein executable and operational data are further effective to cause the one or more processors to augment the giftability score in response to positive user responses to the product in category-based search results, and to decrement the giftability score in response to negative user responses to the product in category-based search results, the category-based search results being relevant to at least one of the interests of the recipient.

17. The system of claim 11, wherein executable and operational data are further effective to cause the one or more processors to augment the giftability score in response to positive user responses to the product in category-based advertisements, and to decrement the giftability score in response to negative user responses to the product in category-based advertisements, the category-based advertisements being relevant to at least one of the interests of the recipient.

18. The system of claim 11, wherein executable and operational data are further effective to cause the one or more processors to augment the giftability score in response to the product being associated with one of an event or an occasion.

19. The system of claim 11, wherein executable and operational data are further effective to cause the one or more processors to:
rank each of the products of the second product set according to its inferred giftability score; and
transmit, for display to a user, each ranked product of the second product set having an inferred giftability score exceeding the giftability score threshold.

20. The system of claim 11, wherein:
each of the interests of the recipient is associated with an affinity score indicating an affinity of the recipient thereto; and each of the products of the first product set is further ranked according to both its giftability score and at least one affinity score associated with the interest.

* * * * *